Oct. 23, 1928.
C. B. HARBISON
1,688,419
LOCOMOTIVE EQUALIZER RIGGING
Filed Sept. 15, 1927
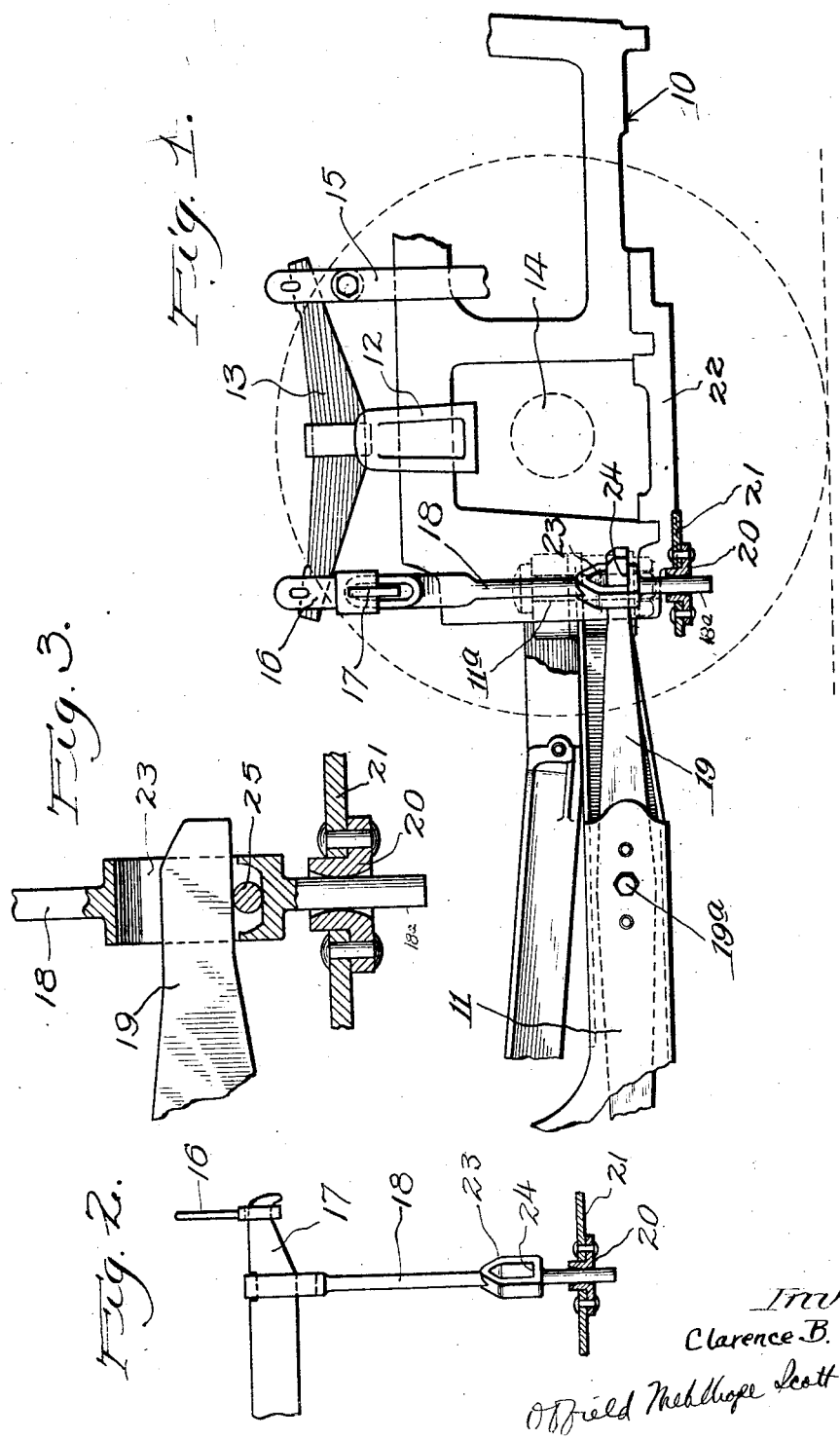

Patented Oct. 23, 1928.

1,688,419

UNITED STATES PATENT OFFICE.

CLARENCE B. HARBISON, OF LIMA, OHIO, ASSIGNOR TO THE OHIO STEEL FOUNDRY COMPANY, OF LIMA, OHIO, A CORPORATION OF OHIO.

LOCOMOTIVE EQUALIZER RIGGING.

Application filed September 15, 1927. Serial No. 219,580.

This invention relates to locomotives having trailer trucks, and more particularly to equalizer rigging for the same, and has for its principal object to provide a new and improved arrangement therefor.

As heretofore constructed, trailer trucks usually are pivotally mounted adjacent their front ends to the locomotive main frame, and have a pair of equalizer bars disposed at opposite sides thereof connected to the rear spring hangers of the rear driving wheels, constituting part of the main equalizing system of the locomotive. Accordingly, the pivotal or radial movement of the trailer equalizer bars tends to twist and sway the lower end of the spring hangers from their normal position, and thus disturb the proper functioning of the equalizing system.

My invention consists in providing guide means for maintaining the spring hangers in proper vertical position, while permitting limited radial movement of the trailer truck equalizer bars relative thereto, as is illustrated in the accompanying drawings showing certain embodiments of the invention.

In the drawings, Figure 1 is a fragmentary side view of the equalizing members constructed in accordance with my invention as applied to one side of a locomotive main frame and trailer truck, the latter parts being indicated in dotted lines.

Figure 2 is a detail rear view drawn to a somewhat smaller scale showing the spring hanger and cross equalizer bar shown in Figure 1, with the truck equalizers removed.

Figure 3 is an enlarged detail view in vertical section showing a modified form of connection for the spring hanger and equalizer bar, including an antifriction roller bearing.

Referring to details of the embodiment shown in the drawing, a portion of the locomotive main frame is indicated at 10 and a portion of the trailer truck frame is indicated at 11. The truck frame is pivotally connected to the main frame at point $11^a$, as usual. The rear driver axle 14 has a spring saddle 12 and spring 13. A front spring hanger 15 is connected to the spring 13 and forms part of the usual equalizing system, further showing of which is omitted herein, as it forms no part of the present invention. The rear spring hanger 16 is herein shown as connected to the outer end of a transverse equalizer bar 17. An auxiliary hanger 18 extends downwardly from the transverse equalizer bar 17, as is best shown in Figure 2.

The trailer truck 11 is provided with the usual pair of equalizer members projecting forwardly for connection with the main equalizing system, herein only one of such equalizer members 19 being show as disposed as usual at one side of the locomotive. In the particular form illustrated, the equalizer bar 19 is pivotally mounted on pin $19^a$, but it will be understood that this bar may, as in some forms of trailer trucks, be formed integral with the trailer truck frame itself.

Referring now more particularly to the novel feature of my invention, it will be seen that I provide a suitable guide member 20 attached to the main frame 10 of the locomotive in any suitable manner to support the lower end of the vertically disposed hanger member 18, but permitting vertical movement thereof. In the form shown, the guide 20 is secured to a plate 21 attached to a pedestal plate 22 indicated as forming part of the main frame 10, said guide being in position to engage the lower end $18^a$ of said hanger member 18. The forward end of the trailer equalizer bar 19 extends into an eye 23 formed in the hanger member 18 and slidably engages a seat 24 to permit horizontal movement of the equalizer arm relative to the hanger 18. Thus when the trailer truck swings radially with respect to the main frame 10, the vertically disposed hanger 18 will be maintained in its normal vertical position, but the equalizer members 19, 19, on opposite sides of the frame may re-adjust themselves by sliding movement on their respective seat 24, in a direction substantially tangential to the axis of the truck.

In the modified form shown in Figure 3, I have provided an anti-friction roller 25 which may be provided in the seat 24 of the eye 23 so as to reduce friction between the part 19 and the seat 24, if desired.

Although I have shown and described one form in which my invention may be embodied, it will be understood that I do not wish to be limited to the exact construction shown and described, but that various changes and modifications may be made without departing from the spirit and scope of my invention.

I claim as my invention:

1. In a locomotive, a main frame, and a trailer truck pivotally connected for horizontal movement relative thereto, a pair of equalizer bars carried by said truck, equalizer rigging carried by said main frame including a pair of vertically disposed hangers guided for vertical movement on said frame, and connecting means permitting limited movement of each of said truck equalizer arms relative to their respective hangers in a direction substantially tangential to the pivotal axis of said truck.

2. In a locomotive, a main frame, and a trailer truck pivotally connected for horizontal movement relative thereto, a pair of equalizer bars carried by said truck, equalizer rigging carried by said main frame including a pair of vertically disposed hangers guided for vertical movement on said frame, each of said equalizer arms having horizontal sliding engagement on their respective hangers in a direction substantially tangential to the pivotal axis of said truck.

Signed at Lima, Ohio, this 12th day of September, 1927.

CLARENCE B. HARBISON.